Sept. 19, 1944.    A. M. WOLF    2,358,371
VEHICLE SUSPENSION CONTROL MECHANISM
Original Filed April 15, 1933

INVENTOR
Austin M. Wolf,
BY M. C. Lyddane
ATTORNEY.

Patented Sept. 19, 1944

2,358,371

UNITED STATES PATENT OFFICE 2,358,371

VEHICLE SUSPENSION CONTROL MECHANISM

Austin M. Wolf, Plainfield, N. J.

Original application April 15, 1933, Serial No. 666,332. Divided and this application June 19, 1939, Serial No. 279,887

19 Claims. (Cl. 188—2)

This invention relates to vehicle suspension control mechanism and constitutes a division of my parent application filed April 15, 1933, Ser. No. 666,332, now Patent No. 2,181,161 issued November 28, 1939. In said application I have described and broadly claimed a coordinated vehicle braking and suspension system, whereby as the vehicle brakes are applied, in response to the braking torque reaction, the rigidity of the suspension system is automatically modified. Thus the reaction of the suspension system to the forces of inertia tending to cause the vehicle body to dive or "nose down," upon brake application is properly controlled to nullify such tendency, and thus materially increase riding comfort and eliminate the potential danger which exists at such times due to difficulty in steering.

The subject matter of the instant application may be generically characterized as relating to the automatic control of vehicle braking and suspension systems in which the braking pressure applied to the vehicle wheels and the rigidity of the suspension system are modified in proportionate ratio to each other in response to a controlling force the magnitude of which is determined by the speed of the vehicle at the time the brakes are initially applied.

It is a particular object of the present invention to provide an improved control means for hydraulic shock absorbers which is automatically responsive to brake application.

Another object of the invention is to provide an automatic shock absorber control means which embodies an inertia device responsive to deceleration of the vehicle upon brake application.

A further object of my invention in one embodiment thereof, is to provide a motor vehicle suspension system in which the resistance of the shock absorber to relative movement between the vehicle body and wheels will be increased during application of the brakes.

An additional object is to provide a system of shock absorber control for the above purpose which will be automatically responsive to modify the reaction of the shock absorber in proportion to the intensity of braking pressure.

With the above and other objects in view, the invention consists in the improved vehicle suspension control mechanism and in the form, construction and relative arrangement of its several parts as will be hereinafter more fully described, illustrated in the accompanying drawing and subsequently incorporated in the subjoined claims.

In the drawing, wherein I have illustrated several simple and practical embodiments of my present invention, and in which similar reference characters designate corresponding parts throughout the several views.

Figure 1:
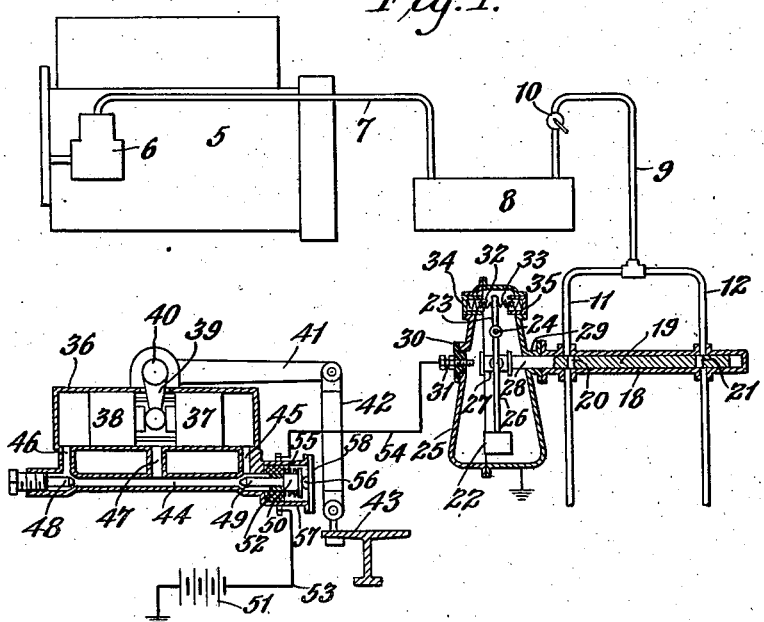
Fig. 1 is a semi-diagrammatic view with certain parts shown in section and illustrating one embodiment of my coordinated vehicle braking and suspension system as applied to a novel electrically controlled hydraulic shock absorber.

Referring in detail to the drawing, in Fig. 1 thereof, I have diagrammatically illustrated the motor vehicle engine 5 provided with an air compressor 6 connected by pipe 7 with the storage tank or reservoir 8. A supply pipe 9 is connected with this reservoir and provided with a suitable control valve 10 operated through suitable connections (not shown) by a hand or foot actuated member of conventional form.

Figure 2:
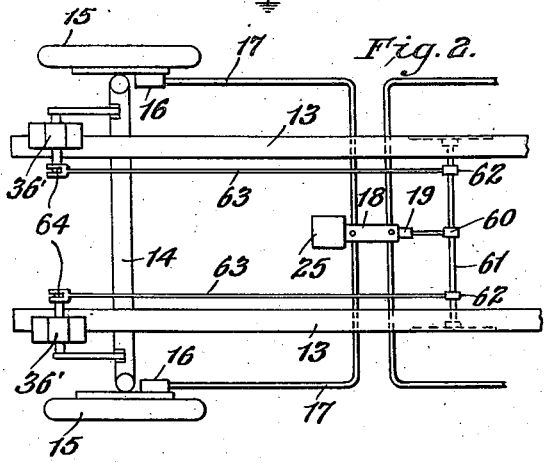
Fig. 2 is a top plan view showing a mechanical control means as applied to a conventional type of shock absorber.

The pipe 9 supplies fluid, under pressure, from reservoir 8 to the branch pipe lines 11 and 12 respectively, which in turn supply the fluid pressures to suitable operating cylinders for the front and rear vehicle brakes. In Fig. 2 of the drawing, I have shown the front portions of the side rails 13 of the vehicle frame or chassis, the front axle 14, with the wheels 15 and braking devices 16. I have also conventionally indicated at 17, the connections between said braking devices and the fluid pressure supply pipe 11. Of course, similar connections are provided between the other branch pipe 12 and the braking devices of the rear vehicle wheels.

The brake applying means also includes a pressure regulating or modulating mechanism for the purpose of controlling the application of braking pressure to the individual vehicle wheels and also proportionately regulating the distribution of the fluid braking pressure between the front and rear wheels of the vehicle. In one embodiment of this regulating mechanism, the branch pipes 11 and 12 are connected by a casing or housing 18 within which the regulating valve 19 is longitudinally slidable. Adjacent to its opposite ends, this valve is provided with the ports or apertures 20 and 21 respectively. The distance between these ports is somewhat less than the distance between the branch pipes 11 and 12, so that in the sliding movement of the valve, these ports will never simultaneously be in full register with said branch pipe lines. As shown in Fig. 1, in the normal position of said slide valve, the ports are in partial register with their respective branch pipes, equal port areas permitting of the flow of fluid pressures in equal volumes through the pipe lines to the brake applying cylinders. The initial application of braking pressure in the normal position of the valve 19 may be sensitively regulated and controlled by the operator in the actuation of the manually operated valve 10, so that under normal operation conditions the brakes can be applied with sufficient intensity to completely arrest or stop the movement of the vehicle, without severe braking torque reaction, and in a reasonable period of time.

However, it is well known that when the vehicle is moving at reasonably high speed and the brakes are suddenly applied, as in an emergency, equal distribution of the braking effort between the front and rear wheels does not give satisfactory performance. In order to counteract the effect of the shifting of the weight of the vehicle body with an increasing proportion on the front wheels during negative acceleration, it is recognized, in current practise, that greater braking effort should be applied to the front wheels than to the rear wheels. However, with increased speeds, this proportional distribution should vary in order to obtain the most efficient braking action and bring the vehicle quickly and smoothly to a stop at such high speeds. Therefore, I have provided means for automatically varying this distribution of the braking pressures between the front and rear wheels in response to deceleration, which of course, varies in effect with variation in vehicle speed and the intensity of initial brake application.

To the above end, as described in my original application, above identified, I provide means for automatically controlling the operation of the pressure regulating or modulating valve 19. However, as will be apparent from the subjoined claims, my improved shock absorber control mechanism to be presently described, may be operatively combined with a manually operable brake pressure regulating mechanism, and in certain of its embodiments will effectively function independently of any direct connection with the brake applying system.

In the present instance, for purposes of illustration, I have shown an automatic control means for the regulating valve 19 comprising a movable inertia responsive mass 22, connected with the rockable arm or member 23 fulcrumed at 24 within the housing or casing 25. This connection between the mass 22 and arm 23 may comprise a rod 26 which is pivotally connected, intermediate of its ends, with a sleeve 27 on one end of a rod 28 connected with valve 19 and slidably mounted in a suitable bearing 29 on the wall of the housing 25. The opposite side wall of said housing has an insulation block 30, suitably mounted therein, and provided with the adjustable screw or bolt 31 which has the dual function of a stop for limiting movement of the valve 19 in one direction and also as an electrical contact.

The inertia mass 22 and arm 23 are yieldingly held in a normal centered position within the housing 25 by means of the springs 32 and 33, respectively mounted in cup members 34 and 35 which are removably threaded in bosses or extensions formed on the opposite walls of the casing or housing 25. By adjusting these cup members, the yielding resistance of the springs 32 and 33 to oscillation of the arm 23 and movement of inertia mass 22 may be properly regulated.

As shown in Fig. 1 of the drawing, the shock absorber includes a casing 36 in which complementary piston members 37 and 38 respectively are interconnected with a lever arm 39 on one end of a rock shaft 40. An arm 41 is rigidly connected at one of its ends to the other end of the shaft 40, the other end of said arm being connected by link 42 with the vehicle axle 43. It will be understood that the pistons 37 and 38 may be provided with the customary relief valves (not shown).

The shock absorber casing 36 is provided with a longitudinal passageway 44 communicating at its opposite ends, as at 45 and 46 respectively, with the spaces between the respective pistons 37 and 38 and the ends of the cylinder or casing 36. The passageway 44 is also centrally connected, as at 47, with the space beween the pistons 37 and 38. The cylinder 36 as well as the passage 44 and its connections with said cylinder is completely filled with the shock absorber fluid or liquid.

In a shock absorber of the above type, each piston 37 and 38 in its reciprocatory movement performs a single function. Upon an upward thrust of the arm 41, due to compression of the body supporting springs, the piston unit is moved to the right from its illustrated position and forces the fluid, under pressure, through the passages 45, 44 and 47, thus controlling the compression action of the spring. In movement of the piston unit resulting from rebound of the spring, in which the arm 41 moves downwardly and the piston unit is reciprocated to the left, the fluid in the left end of cylinder 36 is transferred through passageways 46, 44 and 47 to the space between the pistons 37 and 38. Piston 38 therefore controls the rebound action. The permissible rate of flow of the shock absorber fluid is controlled by the adjustable valve member 48 which restricts the flow of fluid between cylinder 36 and passageway 44 through the connecting passage 46.

In the operation of motor vehicles at extremely high speeds the application of the vehicle brakes will cause a severe reaction on the suspension system, resulting in sudden and severe compression of the body supporting springs. In the operation of present day motor vehicles, upon severe brake application, the diving or "nosing down" of the front end of the vehicle body is an unavoidable consequence. In order to counteract and control excessive spring compression caused by the braking torque reaction, I propose to modify the responsive action of the shock absorbers during severe braking, and thereby stiffen up or increase the rigidity of the suspension system.

Figure 5:
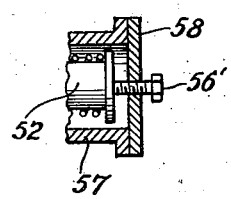
Fig. 5 is a similar detail section showing a slight modification.
Figure 6:
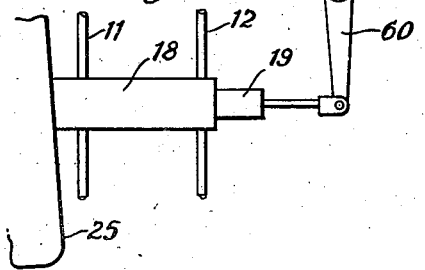
Fig. 6 is a detail side elevation of certain of the parts.

To the above end, in Fig. 1 of the drawing, I illustrate an electrically controlled mechanism for opening and closing the connecting passage between cylinder 36 and passageway 44, and thereby governing the resistance of the shock absorber to relative movement between the vehicle body and frame. In one construction of this electric control means, I provide the needle valve 49 having a solenoid core 50 at one end. This needle valve is set so as to provide a normal restriction of fluid flow at the compression end of the cylinder 36. Upon application of the brakes, in response to severe torque reaction and deceleration of the vehicle, the inertia mass 22 will swing towards the left against the resistance of spring 33 to actuate the regulating valve 19 and increase the proportion of braking fluid pressure supplied to the front wheel brakes through port 20. When sleeve 27 contacts with the stop screw 31, a circuit will then be closed from battery 51 connected with solenoid coil 52 by wire 53 and the wire 54 connecting said coil with the contact screw 31, the current being grounded through the housing or casing 25. The solenoid core 50 will thus be moved to the left and needle valve 49 will also be moved towards its closed position against the resistance of spring 55 to produce greater resistance or restriction to the flow of the fluid or liquid in the shock absorber at the compression end thereof. The spring 55 acts to normally yieldingly hold the core 50 against a suitable stop 56 on the cap plate 58 which closes the outer end of a suitable casing or housing 57 in which the solenoid and needle valve are operatively mounted. This stop of course, determines the normal position of needle valve 49 and if desired, can be replaced by an adjustable set screw, as shown at 56' in Fig. 5. By properly adjusting this set screw valve 49 may be so positioned that, when actuated, it will completely shut off fluid flow through the passage 45.

Figure 3:
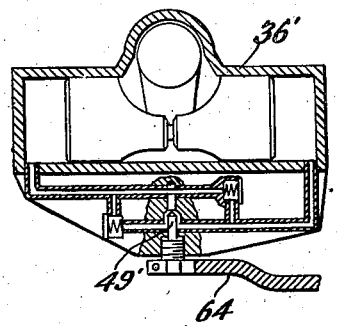
Fig. 3 is a detail sectional view of the shock absorber shown in Fig. 2.
Figure 4:
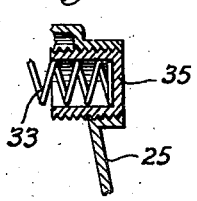
Fig. 4 is a detail sectional view on an enlarged scale.

In Figs. 2 and 3 of the drawing, I have illustrated a mechanical shock absorber control means, in which the brake pressure regulating valve 19 extends rearwardly from the casing 18 and is suitably connected with a lever 60 centrally fixed to a transverse rock shaft 61, journalled at its opposite ends in suitable bearings provided upon the side rails 13 of the vehicle frame. This shaft, adjacent each of its ends, is connected by levers 62 with the rear ends of rods 63. The front ends of these rods are operatively connected with the flow of restricting valves of shock absorbers 36', suitably mounted on the front ends of the frame rails 13 and connected with the front vehicle axle, as above described.

The shock absorbers 36' may be of the conventional type, illustrated in Fig. 3, and similar to that shown and described in patent to Seaholm No. 2,023,034, Dec. 3, 1935. This shock absorber is provided with a rotatable flow controlling needle valve 49' with which the operating arm 64 is connected. The forward ends of rods 63 are operatively connected with these valve operating arms. It will be evident that in this construction, the adjustment of the shock absorber control valve 49' is in proportionate ratio to the intensity of the braking pressure, the resistance of the shock absorbers to downward movement of the front end of the vehicle body being increased proportionately to the braking effort and the severity of vehicle deceleration. At the same time, the regulating valve 19 properly controls the proportionate supply of braking pressure fluid between the front and rear vehicle wheels whereby the proper braking action is obtained in order to bring the vehicle quickly and safely to a stop.

Of course, the severity of the inertia force and, therefore, the extent of movement of the brake pressure modifying valve 19 increases in proportionate ratio to the speed of the vehicle at the time the brakes are applied. It accordingly follows that, in the last described construction, when the brakes are applied at low car speed there will be a relatively small adjustment of shock absorber valve 49', while at higher car speeds a more extensive adjustment of said valve occurs with greater restriction of the flow of shock absorber fluid, in substantially uniform ratio with the increase in braking pressure.

From the foregoing description, the construction and manner of operation of the several disclosed embodiments of the invention may be clearly understood. It will be seen that I have provided novel suspension control mechanism which may be used with particular advantage upon motor vehicles to automatically modify the rigidity of the suspension system upon application of the brakes and increase the resistance of the shock absorbers to relative movement between the vehicle frame and wheels so that the influence of the forces of inertia tending to cause the front end of the vehicle body to dive or "nose down" will be effectively nullified. Also it is evident that certain of the described embodiments of the invention which are operatively controlled by vertically acting inertia forces may be employed independently of the braking system so as to increase the resistance of the shock absorbers and modify the action of the vehicle body supporting springs and thereby prevent extreme relative vertical movement between the vehicle frame and the wheels under ordinary driving conditions.

Although I have herein described several practical embodiments of my present invention, it is apparent that the principles involved are susceptible of incorporation in various other practical mechanical or electrical applications thereof. Accordingly, it is to be understood that the drawing and description are largely illustrative and that the privilege is reserved of incorporating the several novel features of the present disclosure in such other alternative structural forms as may fairly be comprehended within the spirit and scope of the appended claims.

I claim:

1. In a vehicle, suspension means including shock absorbers having resistance regulating means, brake actuating mechanism, means for modifying the effective action of said brake actuating mechanism, means for actuating said shock absorber resistance regulating means, and a common means for operatively controlling each of said two last named means.

2. In a vehicle, suspension means including shock absorbers having resistance regulating means, brake actuating mechanism, means for modifying the effective action of said brake actuating mechanism, means for actuating said shock absorber resistance regulating means, and a common means automatically responsive to vehicle deceleration for operatively controlling each of said two last named means.

3. In a vehicle, suspension means including shock absorbers having resistance regulating means, brake actuating mechanism, means for modifying the effective action of said brake actuating mechanism, means for actuating said shock absorber resistance regulating means, and an inertia device responsive to relative displacement between the vehicle frame and wheels for operatively energizing the modifying means for the brake actuating mechanism and the shock absorber resistance regulating means.

4. In a vehicle, suspension means including shock absorbers having resistance regulating means, brake actuating mechanism, and means automatically responsive to deceleration of the vehicle to control operation of said mechanism and modify braking pressure and simultaneously actuate said shock absorber resistance regulating means.

5. In a vehicle, suspension means including shock absorbers having resistance regulating means, brake actuating mechanism, means automatically responsive to deceleration of the vehicle to modify braking pressure, and means operatively controlled by said last named means to actuate said shock absorber resistance regulating means.

6. In combination with vehicle brake control mechanism including a movable brake pressure modifying member, a vehicle body suspension unit having means for varying the resistance of the unit to relative movement between the vehicle body and wheels, and means operatively interconnected with and controlled by said brake pressure modifying member in the movement thereof independently of the brake pressure medium to actuate said resistance varying means of the suspension unit.

7. In combination with vehicle brake control mechanism including a movable brake pressure modifying member, actuating means for said member operatively responsive upon brake application to a vehicle-speed-induced force determining the degree of modification of braking pressure, a vehicle body suspension unit having means for varying the resistance of the unit to relative movement between the vehicle body and wheels, and means operatively connecting the brake pressure modifying member with said resistance varying means of the suspension unit to actuate the latter and progressively increase the resistance of the suspension unit in uniform ratio with the modification of braking pressure.

8. In combination with vehicle brake control mechanism having a brake pressure regulating part, means connected with said part, responsive to a force varying in magnitude with vehicle speed at the time of brake application, to control the operation of said part and correspondingly vary the intensity of braking pressure, a vehicle body suspension unit having means for varying the resistance of the unit to relative movement between the vehicle body and wheels, and means operatively controlled by said first named means for actuating said resistance varying means to modify the resistance of the suspension unit.

9. In combination with vehicle brake control mechanism having a brake pressure regulating part, means connected with said part, responsive to a force varying in magnitude with vehicle speed at the time of brake application, to control the operation of said part and correspondingly vary the intensity of braking pressure, a vehicle body suspension unit having means for varying the resistance of the unit to relative movement between the vehicle body and wheels, and means operatively controlled by said first named means for actuating said resistance varying means to modify the resistance of the suspension unit in uniform ratio to changes in the intensity of braking pressure.

10. In a vehicle, a braking system including means responsive to a force proportional in magnitude to vehicle speed at the time of brake application to modify braking pressure, a vehicle body suspension system having means to modify the rigidity thereof, and means responsive to the operation of said brake pressure modifying means to actuate said last named means and modify the rigidity of the suspension system.

11. In a vehicle, a braking system including means responsive to a force proportional in magnitude to vehicle speed at the time of brake application to modify braking pressure, a vehicle body suspension system having means to modify the rigidity thereof, and means connected with and operated by said brake pressure modifying means to actuate said last named means and modify the rigidity of the suspension system in substantially uniform ratio with the modification of braking pressure.

12. In a vehicle, a braking system including means to modify braking pressure, a shock absorber having resistance regulating means, and means responsive to a force varying in magnitude with vehicle speed at the time of brake application to actuate the brake pressure modifying means and resistance regulating means respectively and regulate the resistance of the shock absorber in substantially uniform ratio with the modification of braking pressure.

13. The method of controlling the operation of vehicle braking and suspension systems which consists in modifying the braking pressure and the rigidity of the suspension system in substantially the same proportionate ratio to vehicle speed at the time of brake application.

14. The method of controlling the operation of vehicle braking and suspension systems which consists in increasing the intensity of braking pressure in proportionate ratio to vehicle speed at the time of initial brake application, and progressively increasing the rigidity of the suspension system in uniform ratio with the increase in braking pressure.

15. The method of controlling the operation of vehicle braking and suspension systems which consists in modifying the braking pressure in response to a force which is varyingly effective in proportionate ratio to vehicle speed at the time of brake application, and modifying the rigidity of the suspension system in response to such force in proportionate ratio to the modification of braking pressure.

16. The method of controlling the operation of vehicle braking and suspension systems which consists in increasing the braking pressure in proportionate ratio to the severity of inertia force resultant from brake application and increasing the rigidity of the suspension system in response to such inertia force in proportionate ratio to the increase in braking pressure.

17. In a vehicle, suspension means including shock absorbers, electrically controlled resistance regulating means for said shock absorbers, a braking system having brake pressure modifying means, and means responsive to the operation of said modifying means for energizing said shock absorber resistance regulating means.

18. In combination with vehicle brake control mechanism having a brake pressure regulating part, means connected with said part, responsive to a force varying in magnitude with vehicle speed at the time of brake application, to control the operation of said part and correspondingly vary the intensity of braking pressure, a vehicle body suspension unit having means for varying the resistance of the unit to relative movement between the vehicle body and wheels, electrical means for actuating said resistance varying means, and means for energizing said electrical means upon effective operation of said brake pressure regulating part, to actuate said resistance varying means and modify the resistance of the suspension unit.

19. In a vehicle, a braking system including means responsive to a force proportional in magnitude to vehicle speed at the time of brake application to modify braking pressure, a vehicle body suspension system having electrically controlled means to modify the rigidity thereof, and means responsive to the operation of said brake pressure modifying means to energize said last named means and modify the rigidity of the suspension system.

AUSTIN M. WOLF.